Figure 1:
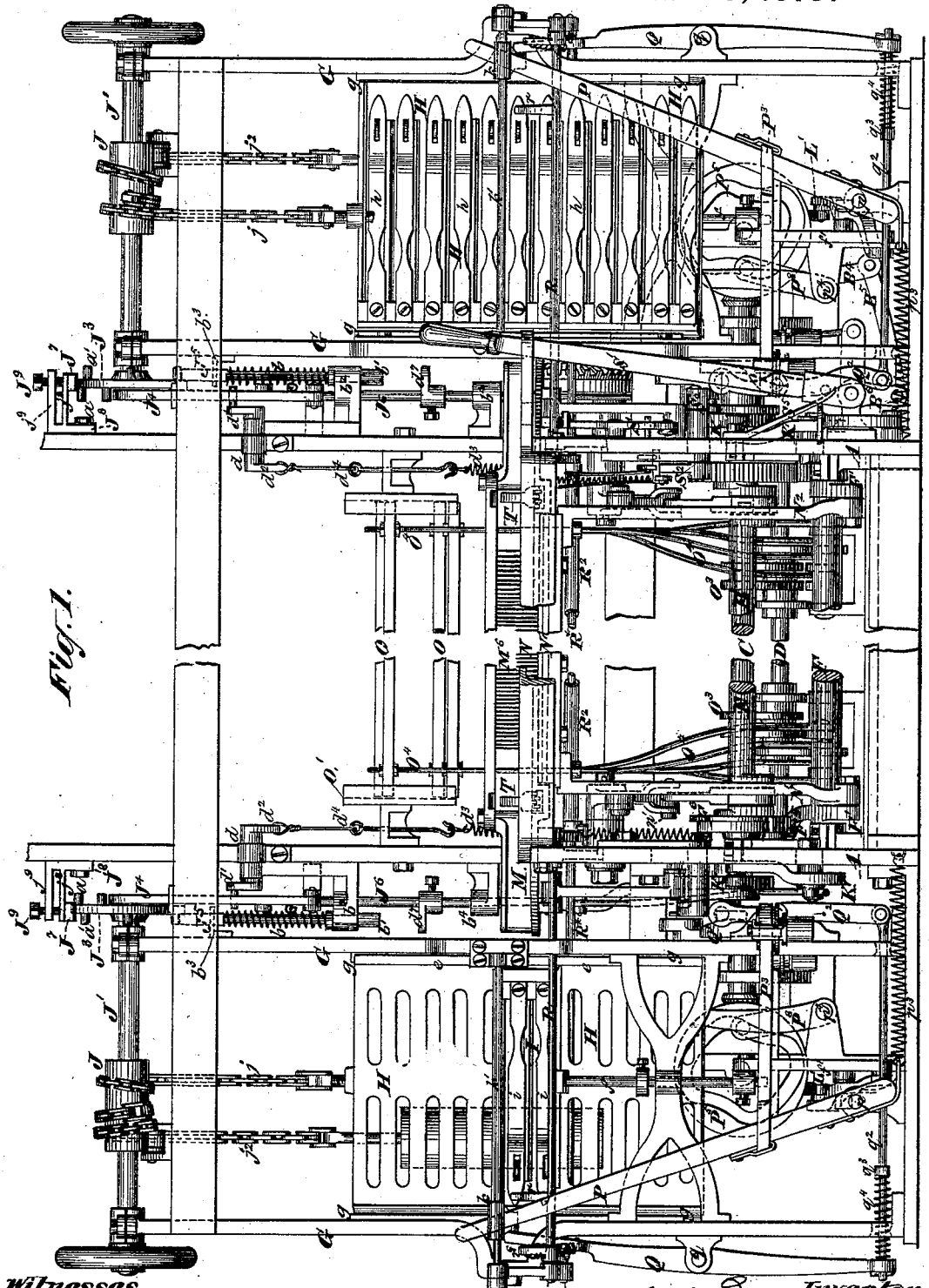

J. C. DUCKWORTH.
Power-Loom.

No. 211,718. Patented Jan. 28, 1879.

Witnesses
John Becker
Fred. Haynes

Inventor
John C. Duckworth

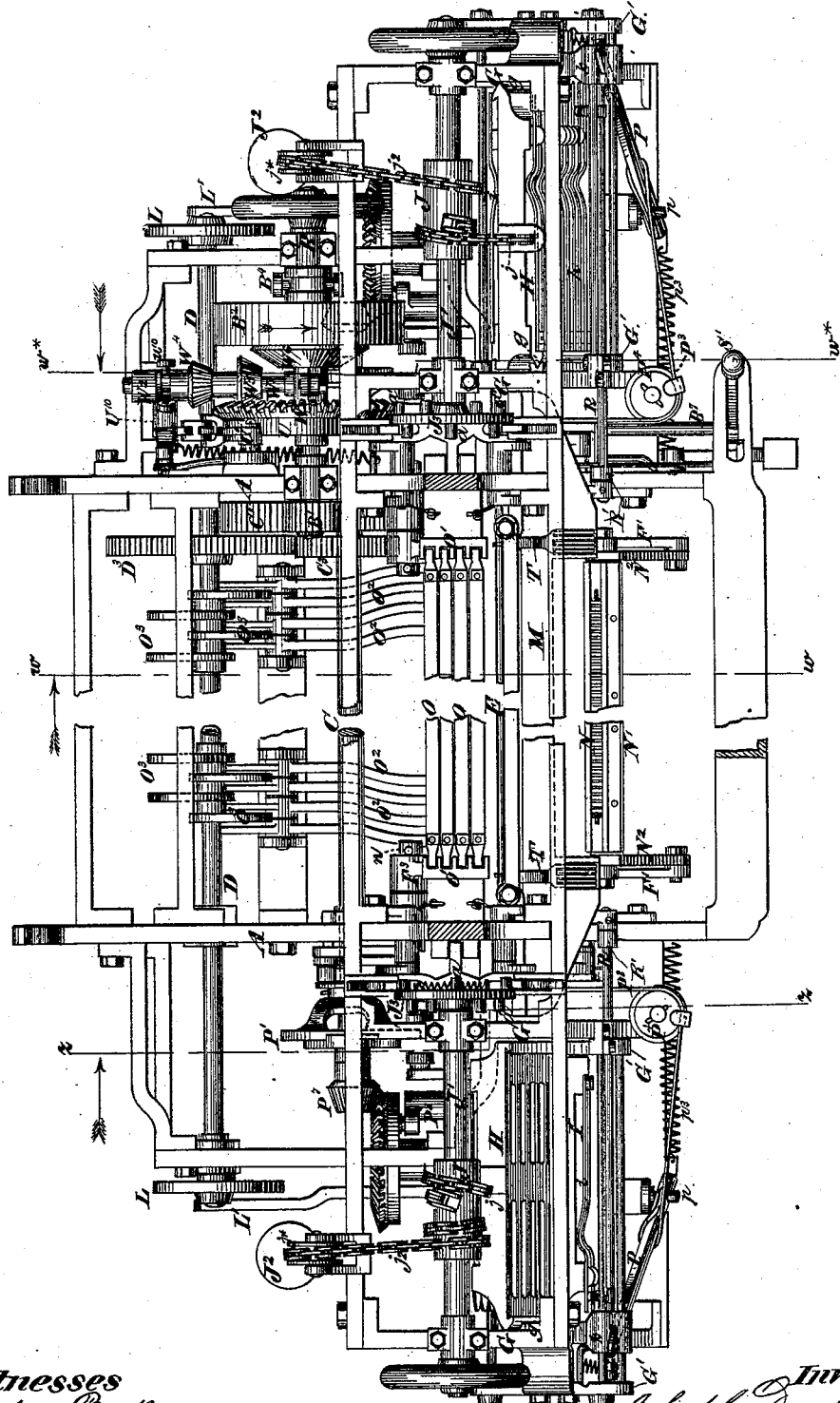

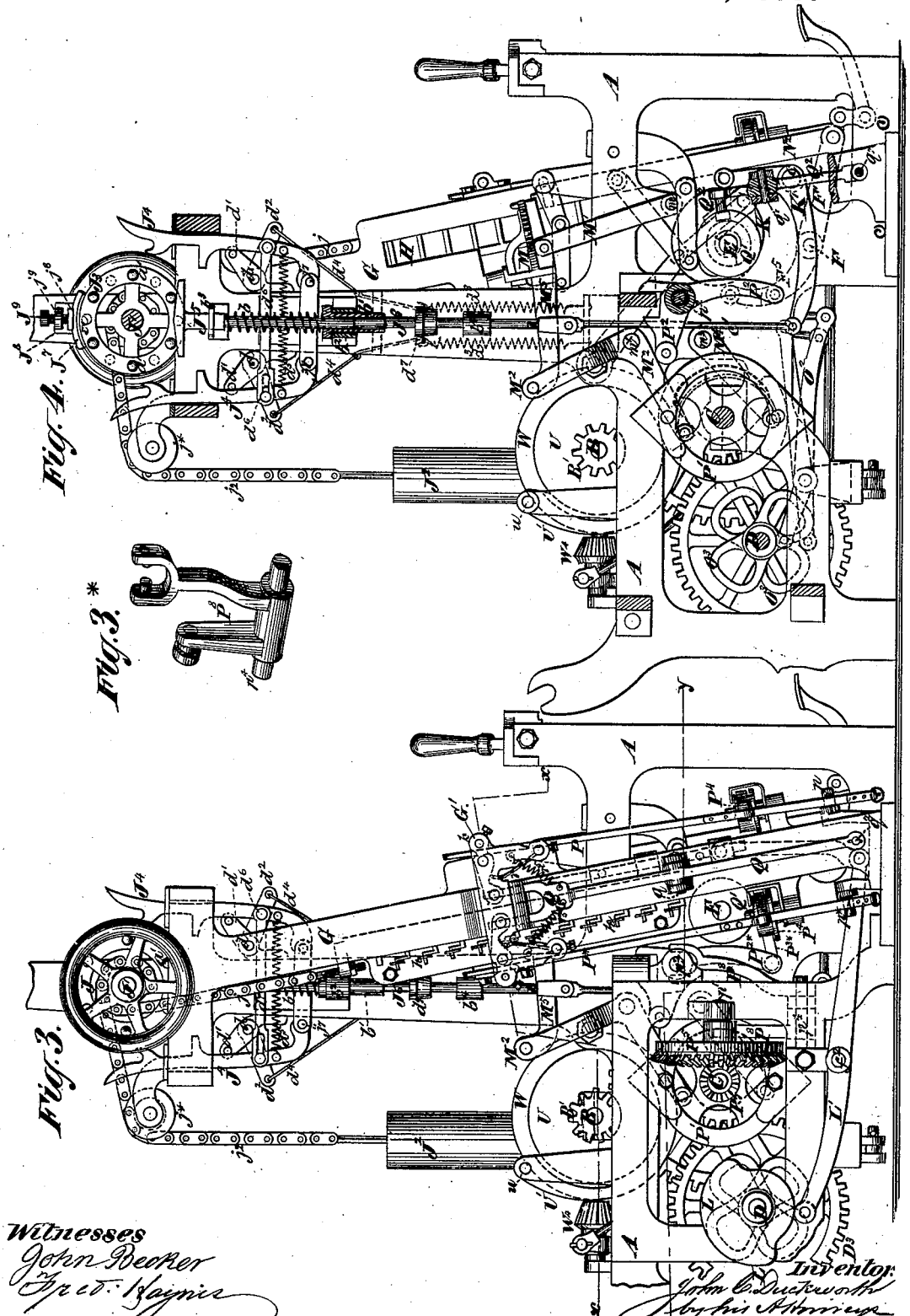

J. C. DUCKWORTH.
Power-Loom.
No. 211,718. Patented Jan. 28, 1879.
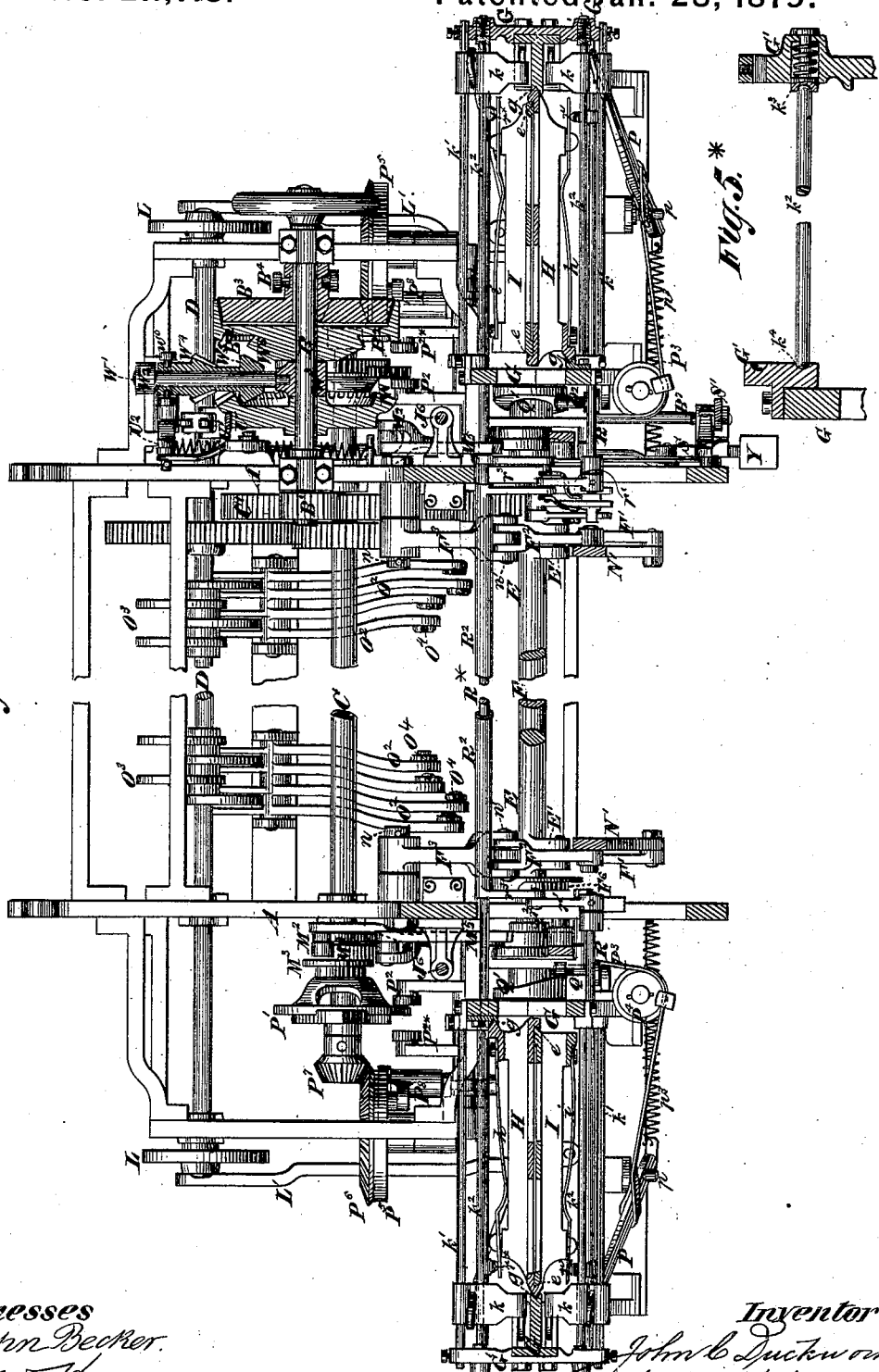
Witnesses
John Becker.
Fred Haynes
Inventor
John C. Duckworth
by his Attorneys
Brown & Allen J. C. DUCKWORTH.
Power-Loom.

No. 211,718.      Patented Jan. 28, 1879.

Witnesses
John Becker
Fred. Wagner

Inventor
John C. Duckworth
by his Attorneys
Brown & Allen

J. C. DUCKWORTH.
Power-Loom.
No. 211,718. Patented Jan. 28, 1879.
8 Sheets—Sheet 6.
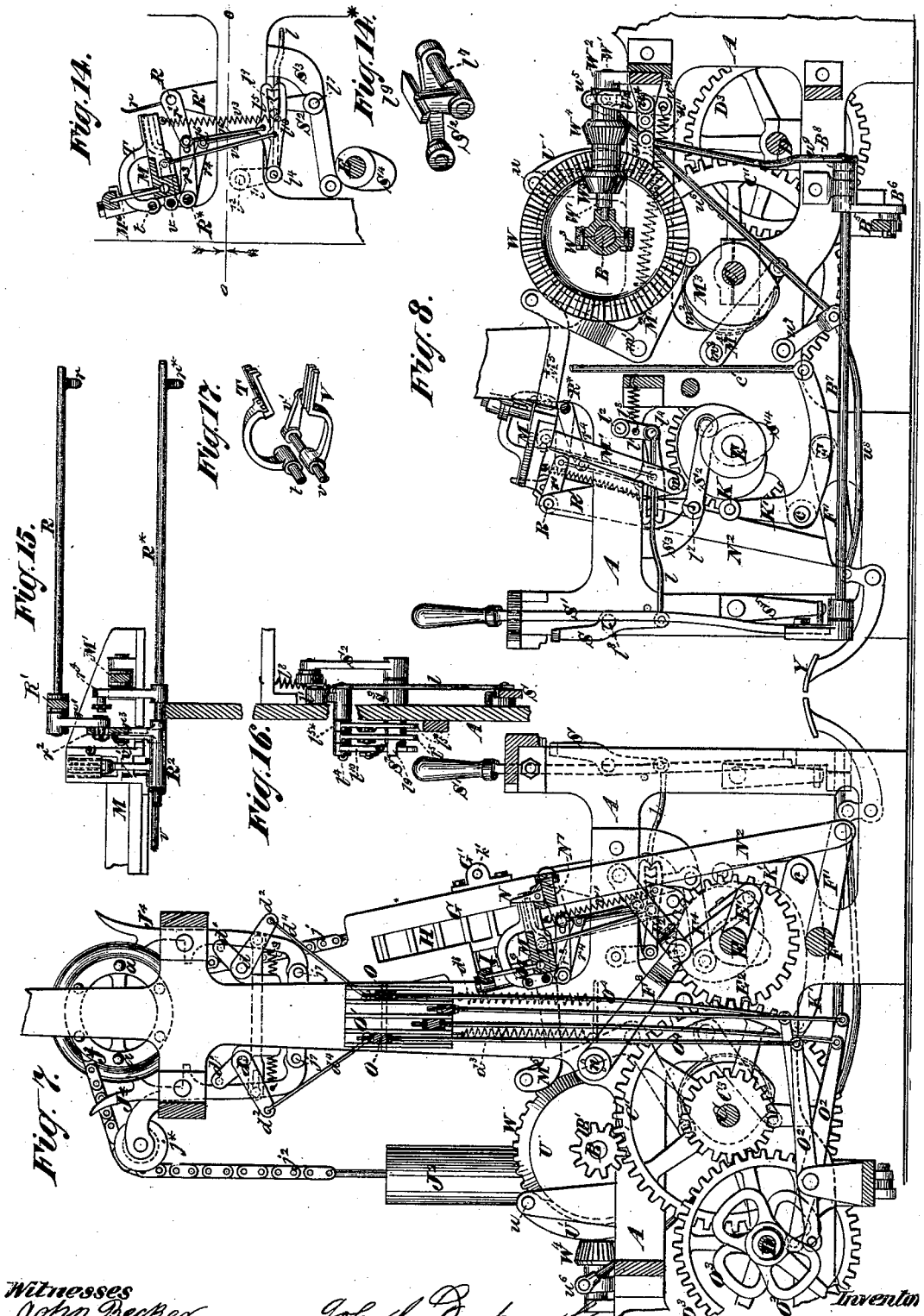

J. C. DUCKWORTH.
Power-Loom.
No. 211,718.  Patented Jan. 28, 1879.
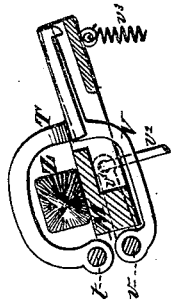
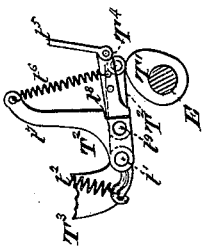
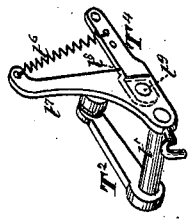
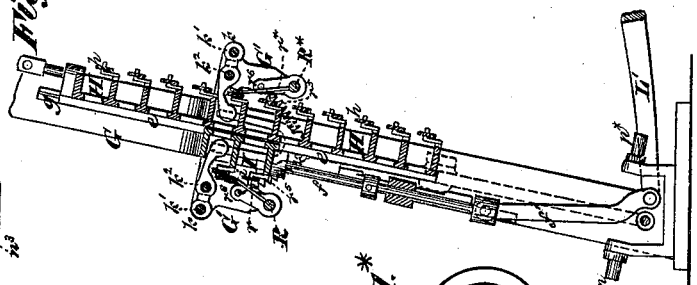
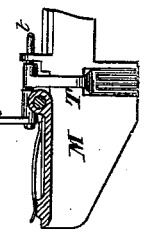
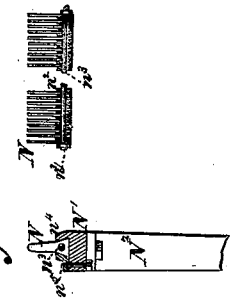
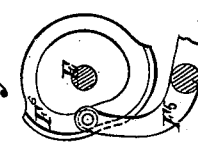
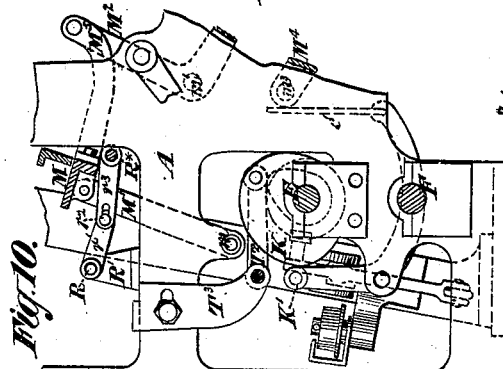
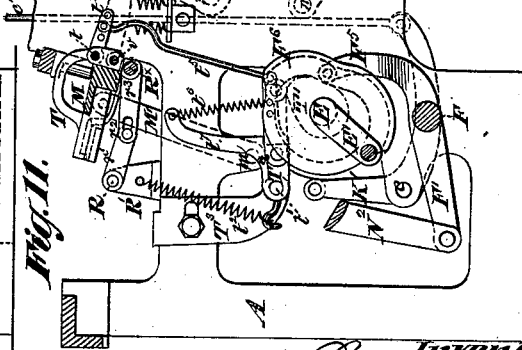
Witnesses
John Becker
Fred Rayner
Inventor:
John C. Duckworth
by his Attorneys
Brown & Allen

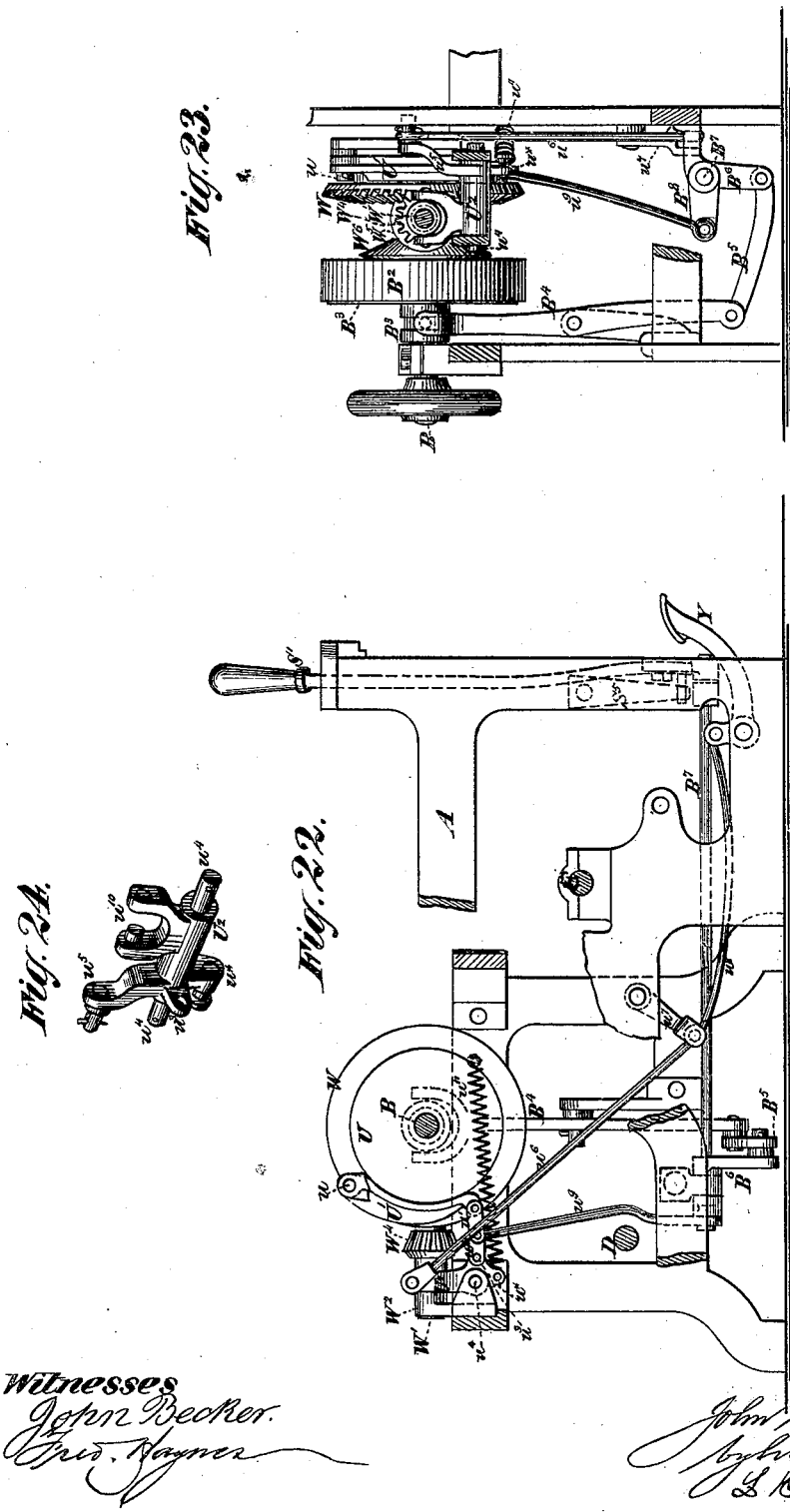

UNITED STATES PATENT OFFICE.

JOHN C. DUCKWORTH, OF NEW YORK, N. Y., ASSIGNOR TO E. S. HIGGINS & COMPANY, OF SAME PLACE.

IMPROVEMENT IN POWER-LOOMS.

Specification forming part of Letters Patent No. 211,718, dated January 28, 1879; application filed February 20, 1878.

*To all whom it may concern:*

Be it known that I, JOHN C. DUCKWORTH, of the city, county, and State of New York, have invented certain new and useful Improvements in Power-Looms; and I do hereby declare that the following is a full, clear, and exact description of the same, reference being had to the accompanying drawings, forming part of this specification.

One part of this invention, which is more especially intended to be applied to looms for weaving ingrain carpets and other fabrics in which the pattern is produced, wholly or in part, by changing the shuttles, consists in the combination, with two series of rising and falling shuttle-boxes, arranged one in front of the other on either side of the loom, of a raceway moving back and forth between positions opposite to each set of shuttle-boxes, and a comb detached from and moving independently of said raceway for beating up the filling.

It also consists in the novel arrangement of the shuttle-boxes, their picker-openings, and their binders, in combination with a shuttle-raceway independent of the lay which carries the said comb.

It further consists in means, hereinafter described, for raising and lowering the two sets of shuttle-boxes on either side of the loom.

Another part of the invention consists in means, hereinafter described, for liberating the pickers in case of their failure to pass out of the shuttle-boxes before the rising-and-falling movement of the latter takes place.

Another part of the invention consists in means, hereinafter described, for producing and controlling the operation of the pickers.

Another part of the invention consists in improvements, hereinafter described, in the stop-motion.

Finally, the invention consists in improvements, hereinafter described, in the mechanism for throwing the loom out of gear, for reversing it, and for operating the brake.

In the accompanying drawings there is represented a power-loom for weaving carpets having all the improvements applied, the Jacquard machine and its attachments being omitted because their representation is not necessary to illustrate the invention.

Figure 6:
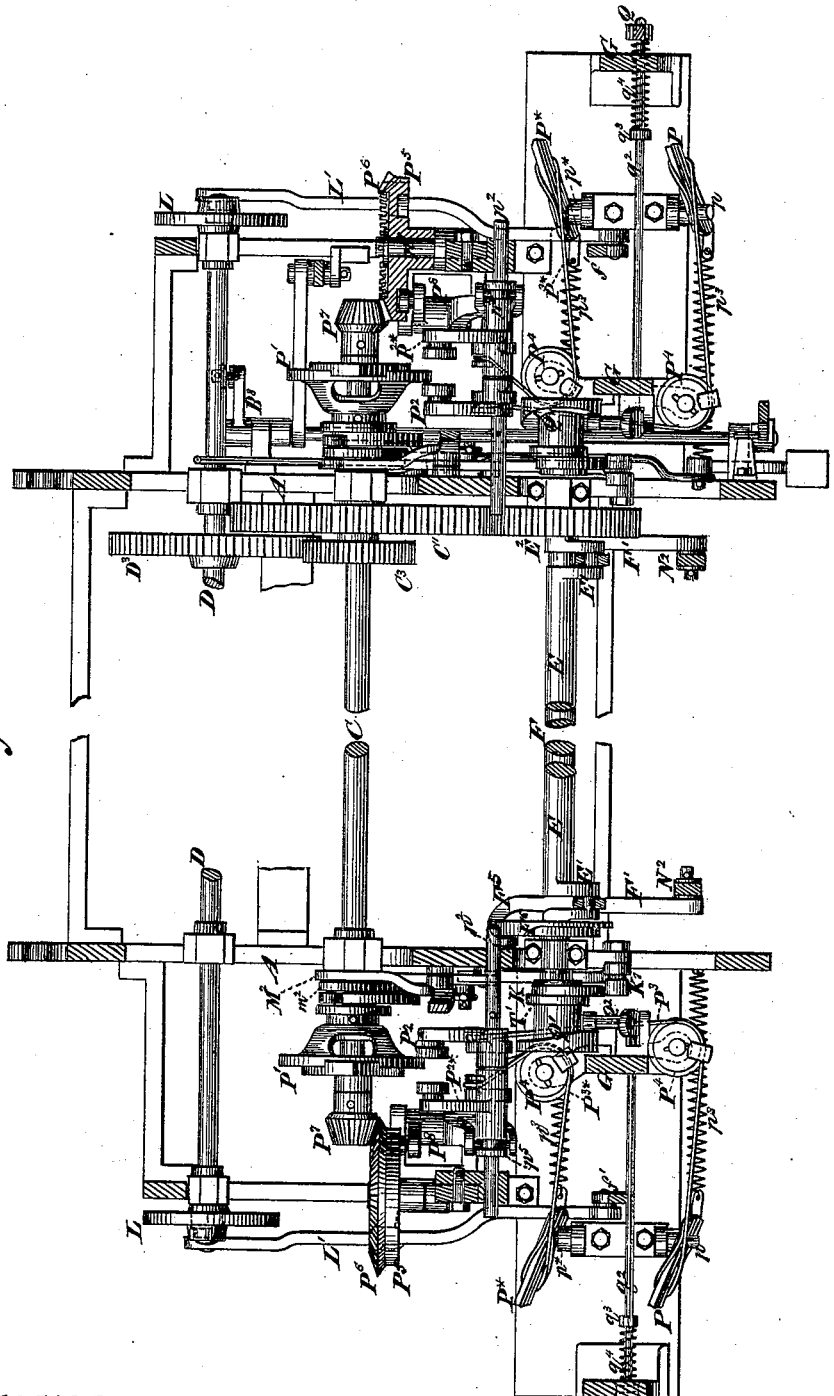

Figure 1 is a front elevation, showing the central portion of the loom broken away to reduce the width of the figure. Fig. 2 is a plan corresponding with Fig. 1. Fig. 3 is a side elevation. Fig. 4 is a vertical section taken in a direction parallel with the warp in or nearly in the planes indicated by the line $z\ z$ on Fig. 2. Fig. 5 is a horizontal section taken in or nearly in the planes indicated by the line $x\ x$ in Fig. 3. Fig. 5* is an enlarged detail view of one of the picker-guide spindles and its appurtenances. Fig. 6 is a horizontal section taken in or nearly in the planes indicated by the line $y\ y$ in Fig. 3. Fig. 7 is a vertical section taken directly through the center of the loom, as indicated by the line $w\ w$ in Fig. 2. Fig. 8 is a vertical section in the line $w^*\ w^*$ of Fig. 2. Figs. 3*, 9, 10, 11, 11*, 12, 13, 14, 14*, 15, 16, 17, 18, 19, 20, 21, 22, 23, and 24 are detail views, which will be hereinafter explained.

A is the ordinary main framing of the loom, having provided within or upon it the bearings for the driving-shaft B, the main shaft C, the cam-shaft D, the crank-shaft E, and comb-lay rock-shaft F.

G G are fixed standards, arranged in pairs, one pair on each side of the loom, for receiving between them the shuttle-boxes and supporting certain portions of the mechanism for operating the said boxes.

H H and I I are the two sets of shuttle-boxes, each set H H containing or consisting of a number of boxes corresponding with the greatest number of shuttles intended to be used, and each set I I containing or consisting of any suitable number of boxes, according to the nature of the weaving to be produced. Two boxes, as represented, will ordinarily be sufficient in each set I I; but a greater number may be employed, or only a single box in each set. For the sake of distinction, H H may be designated as the main shuttle-boxes and I I may be designated as the auxiliary shuttle-boxes. On one side of the loom (the right side in the drawing) the main boxes are in front, and on the other side (the left side in the drawing) the auxiliary boxes are in front, the auxiliary boxes on either side being opposite to the main boxes on the other side.

The boxes of each main set H H are arranged close together, one above another, and connected, so that all rise and fall together, and are fitted to slide in guides $g$ $g$, provided on the standards G G, the said guides being upright or slightly inclined, as shown, from a vertical position, and each set is suspended by a chain, $j$, from one of two barrels, J J, the shafts $J^1$ $J^1$ of which are arranged horizontally in suitable bearings on the upper part of the loom-framing.

The weight of each set is counterbalanced by a weight, $J^2$, suspended from a chain, $j^2$, which is attached to its respective barrel J, and passes over a pulley, $j^*$, on the framing.

On the inner end of each shaft $J^1$ is a wheel or disk, $J^3$, furnished with pins $a$ and $a'$ on its opposite sides.

The pins $a'$ are operated upon for the purpose of stopping the rotation of their respective shafts and barrels by means of T-headed stops $J^5$, (see Figs. 1 and 4,) the upright stems of which work in fixed guides $b^3$. (See Fig. 4.) These stops are pressed upward against the said pins by spiral springs $b$, the said stops operating upon two pins, $a'$, at a time, as shown in Fig. 4, to prevent the barrels from turning in either direction, but yielding to allow the barrels to turn in either direction when suitable force is applied to them.

The pins $a$ $a$ are operated upon to turn the barrels in either direction to raise and lower the shuttle-boxes by means of pawls $J^4$, of which two are provided for each wheel $J^3$— one arranged on each side of the center of the wheel, and the two being pivoted at $j^7$, as shown in Figs. 3, 4, and 7, to opposite ends of the T-head of a rod, $J^6$, which slides up and down in fixed guides $b^2$ and $b^4$, attached to the loom-framing.

The front pawl, $J^4$, serves to turn the barrel in one direction, and the corresponding back pawl serves to turn it in the opposite direction, the turning in one direction effecting the raising of the shuttle-boxes, and the turning in the other direction effecting the lowering thereof, either pawl being brought into position to operate on the pins $a$ $a$, as required by the Jacquard machine, or other pattern-producing mechanism. The upward movement of the said pawls, by which they are made to act on the pins $a$ $a$ to turn the barrel, is produced by a cam, K, (see Figs. 4 and 8,) on the crank-shaft E, which operates on one end of an elbow-lever, K', which works on a fixed fulcrum, $c$, secured in the framing A of the loom, and the other end of which is connected by a rod, $c'$, with the lower end of the pawl-rod $J^6$.

The pawls $J^4$ are each held out of gear from the pins $a$ $a$ at all times, except when the barrel is to be turned, by means of a separate spiral spring, $d^3$, (see Figs. 1, 4, and 7,) the lower end of which is connected with the loom-framing, and the upper end is connected by rods $d^4$ with an arm, $d^2$, on a short rock-shaft, $d$, which works in suitable fixed bearings, and another arm, $d^1$, of which presses against the inner edge of the pawl to force the latter out of reach of the pins $a$ $a$.

When one of the pawls is required to come into action the pull of its spring $d^3$ is taken off by a connection of the rods $d^4$ with cords of the Jacquard machine, and the pawl is left free to be pulled into gear by a spring, $d^5$, which connects the two pawls belonging to either barrel J.

In order to prevent the possibility of both pawls $J^4$ belonging to either barrel from being brought into gear at once and thus causing the breakage of mechanism, the two pawls are connected together by rods $d^6$, which keep them always at a proper distance apart. These rods $d^6$ are slotted, as shown in Figs. 3 and 4, at their connection with one pawl, to allow the necessary movement of one relatively to the other for either to come in or out of gear with the pins $a$ $a$.

In order to insure the efficient action of the stop $J^5$ upon the pins $a'$ $a'$ to hold the barrel secure, and thus keep the shuttle-boxes in their proper position at the time of throwing the shuttle, the spring $b$ has its pressure increased at the proper time by a toe, $d^7$, on the pawl-rod $J^6$ pushing upward against the lower end of a sleeve, $b^1$, which is fitted to the lower part of the upright rod of the stop $J^5$, and the upper end of which serves as a bearing for the lower end of the said spring $b$. This sleeve $b^1$ works in a fixed guide, $b^2$, (see Figs. 1, 3, and 4,) attached to the loom-framing, and is furnished above the said guide with a collar, which comes to a bearing on the top of the said guide, and so forms a fixed bearing for the spring when the sleeve is not lifted by the toe $d^7$.

$J^7$ $J^8$ $J^9$ $j^8$ $j^9$ are parts of a friction-brake applied to the wheels $J^3$, for the purpose of preventing the barrels J from being turned too far by their own momentum and that of their appurtenances. This brake, however, forms no part of my invention.

The shuttle-boxes of each auxiliary set I I are arranged one above another, and rigidly connected together to slide up and down in dovetail guides $e$ $e$ provided on the face and back of their respective set of main shuttle-boxes H H, as shown in Figs. 1 and 5, and also in the detail view, Fig. 9, which represents a vertical transverse section of the two sets of shuttle-boxes and their appurtenances belonging to one side of the loom, and, as each set has its respective binders $h$ $h$ or $i$ $i$ and the openings for the pickers $k$ on the outer side, the two sets are enabled to be brought close together without any or with the least possible space between them. Each set of auxiliary shuttle-boxes is connected by a stem, $f$, at the bottom, and a connecting-rod, $f^1$, as shown in Figs. 1 and 9, with the front end of one of two levers, L' L', which work on fixed fulcrums $f^2$, (see Fig. 3,) and the rear end of each of which is acted upon to lift the boxes by means of one of two cams, L L, (see Figs. 2, 3, 5, and 6,) on the cam-shaft D, the said cams being so shaped and arranged as to lift and allow the descent of the boxes at the proper time preparatory to the shuttles being received by or discharged from them.

M is the vibrating or reciprocating shuttle-raceway, having the reed $M^6$ attached to it in the usual way. This raceway is supported at or near its ends, as shown in Figs. 4 and 8, and also in Figs. 10 and 11, which are partial sections of the loom taken parallel with the warp, by being pivoted to the upper ends of a pair of vibrating arms, $M^1$, each of which is attached by a pivot, $m$, to the loom-framing, and by having two rigidly-attached arms, $M^5$, which are connected with the upper arms of a pair of elbow-levers, $M^2$, which work on fixed fulcrum-pins $m^1$, secured in the loom-framing A, and the lower arms of which are operated upon by a pair of cams, $M^3$, provided on the main shaft C, for the purpose of producing the reciprocating movement of the raceway back and forth, by which it is brought from a position opposite to the main shuttle-boxes to a position opposite the auxiliary shuttle-boxes on either side of the loom, and vice versa for changing the shuttles. These cams also operate on the ends of a pair of levers, $M^4$, which are attached to the fixed fulcrum-pins $m^3$, secured in the loom-framing. Each lever $M^4$ and the lower arm of its respective lever $M^2$ are connected together by a C-shaped spring, $m^2$, which tends to pull them toward each other, and keep the bowls which are provided on the lower ends of the said levers $M^2$ and $M^4$ in contact with the periphery of their cam $M^3$. The forward movement of the raceway is produced by the action of the cams $M^3$ upon the elbow-levers $M^2$, and the backward movement is produced by the action of the said cams on the levers $M^4$, which transmit motion to the elbow-levers $M^2$ through the connecting-springs $m^2$. These springs yield to any obstruction to the backward movement of the lay that may occur by reason of the shuttles failing to enter the boxes, and thereby prevent breakage, which might otherwise in such case occur.

The cams $M^3$ are of such shape that they hold the raceway at each end of its stroke in a fixed position opposite either set of shuttle-boxes long enough for the operation of throwing the shuttle.

I may here remark that the mechanism for operating the raceway is not claimed as my invention.

N is the comb for beating up the weft, and $N^1$ is the independent lay, to which the said comb is attached, the said lay being carried by vibrating swords $N^2$, pivoted, as shown in Figs. 7 and 11, to the arms $F^1$ of the rock-shaft F. The said swords are also connected, as shown in Figs. 5 and 7, by toggle-connections $F^2$ $F^3$, with fixed studs $n$, secured in the loom-framing, and the joint-pins $n^1$ of the said toggles are connected by rods $F^4$ with the two cranks $E^1$ on the crank-shaft E. The rock-shaft F has also an arm, $F^5$, (see Figs. 1, 6, 11, and 11*,) which is operated upon by a grooved cam, $F^6$, on the crank-shaft E. One side of this cam is shown in Fig. 11, and the other side of said cam is shown in a detached view, Fig. 11*. The vibrating movement of the comb-lay for beating up the filling is produced by the action of the cranks $E^1$ upon the toggle-connections, and the upward and downward movement of the lay to produce the entrance of the comb into the warp, and its withdrawal therefrom is produced by the action of the cam $F^6$ upon the arm $F^5$ of the rock-shaft. The toggle-connection is made to produce a double beat of the lay, the upward movement of the joint of said connection to a straight or rectilinear position producing the first beat, and the lay being pulled back a short distance by the joint of said connection being moved upward beyond the straight position, and again moved forward by the descent of the said joint to the straight position.

The comb N is constructed, as shown in Figs. 12 and 13, of teeth, which are secured together by a bolt, $n^3$, passing through them, and which have their bases of dovetail form to enable them to be secured between a dovetail lip, $n^4$, on the lay, and a dovetail clamping-plate, $n^5$, secured to the lay by bolts. The particular construction of or means of operating the comb do not, however, constitute parts of my invention.

O O, Figs. 1, 2, and 7, are the journals for lifting the mails, through which certain of the warp-yarns pass. These are arranged to work in upright fixed guides $O^1$ on the loom-framing; but instead of being operated from above they are operated by treadles $O^2$, which are arranged in pairs below, each journal being connected with one pair of treadles by two rods, $O^4$ $O^4$, at its opposite ends. These treadles are operated by cams $O^3$ on the cam-shaft D, one pair of cams for each pair of treadles and each journal.

This method of operating the journals, though described to elucidate the construction of the loom, is not intended to be considered as part of the invention.

The pickers $k$, of which there are two on each side of the loom, one for each set of shuttle-boxes, are each arranged to slide on two stationary parallel spindles, $k^1$ $k^2$, which are secured in brackets $G'$, bolted to the shuttle-box guide-frames G G, as shown in Figs. 5 and 9. The outer spindle, $k^1$, of each pair is rigidly secured at its ends in its respective brackets $G'$; but the inner one, $k^2$, is held between centers, as shown in Fig. 5*, which is a horizontal section, on a larger scale than Fig. 5, of the brackets and the guide-spindles $k^2$ of one side of the loom. The ends of the said spindles $k^2$ are made rounded or conical to form male centers, and the inner end of each is received in a fixed female center, $k^4$, in its respective inner bracket $G'$, and the outer one in a female center formed in the inner end of a yielding center plug, $k^3$, which is fitted to slide in and out in a bearing in the outer bracket $G'$, but which is pressed against the end of the spindle by a spiral spring coiled around the said plug. This spring and yielding plug hold the spindle $k^2$ securely in position during the proper operation of the pickers; but in case of the picker failing to be drawn out of the shuttle-box before the box rises or descends, the box, in its ascent or descent, will carry the head of the picker up or down with it, and so pull out the rod $k^2$ from between the centers $k^4$ and $k^3$, and leave the picker free to swing on the spindle $k^1$ until, by the continued ascent or descent of the boxes, its head will be enabled to pass out of the box, or until the picker has been pulled out at the end of the box by the attendant. This pulling out of the spindle $k^2$ from between its centers is permitted by the springing or flexure of the spindle itself, or by the slipping back of the yielding center-plug $k^3$. By thus providing for the pulling out of the spindle $k^2$ the sticking of the picker in a box is prevented from interfering with the ascent and descent of the boxes, and the ascent or descent of the boxes, if it should take place, is prevented from injuring the pickers or their appurtenances.

The picking-sticks P P*, two for each side of the loom, are arranged one in front of the front set of shuttle-boxes and one behind the back set of shuttle-boxes, working on fixed pins $p\ p^*$, and the picking movement of both pickers on either side is produced by means of the two tappet-wheels $P^1$ (shown in Figs. 3, 4, 5, 6) on the main shaft C, the said tappet-wheel operating on either one of two elbow-levers, $P^2$ or $P^{2*}$, (see Figs. 4, 5, 6,) according to which shuttle is to be thrown, the said levers being connected with their respective sticks by straps $P^3$ and $P^{3*}$, which pass around guide-pulleys $P^4$, working on fixed studs attached to the loom-framing. The said levers $P^2$ and $P^{2*}$ are both loose upon the same short shaft, $p^2$, which constitutes their fulcrum, and upon which they are so confined as to be prevented from moving longitudinally thereon, but as to be compelled to move with the said shaft when the latter moves lengthwise. The said shaft $p^2$ is fitted to bearings in the loom-framing, in which it is capable of a longitudinal movement for the purpose of bringing the bowl which is attached to either lever within range of the tappet-wheel, according to which picker-stick is to be operated, or of bringing both levers to a position in which neither will be operated upon by the tappet-wheel, and so as to prevent the cam from operating both sticks at once. The longitudinal movement of the said shaft is produced by one of two cams, $P^5$, (shown in Figs. 1, 5, and 6,) which is attached to a bevel-gear, $P^6$, which turns freely on a fixed stud, $p^1$, secured in the loom-framing, and receives motion from a smaller bevel-gear, $P^7$, on either end of the main shaft, and acts upon the said shaft $p^2$ through a forked lever, $P^8$, working on a fixed fulcrum, $p^4$, one arm of the said lever being acted upon by the cam, and the other arm, which is forked, taking hold of a grooved collar, $p^5$, on the shaft $p^2$. This lever is visible in Figs. 1, 3, and is represented in a separate perspective view, Fig. 3*; but its relation with the cam $P^5$ and the shaft $p^2$ are best shown in Fig. 6, on one side of which the cam is shown in section.

The backward movements of the picker-sticks are produced by spiral springs $p^3$.

Q, Figs. 1, 3, and 6, are the shuttle-stop levers, working on fulcrum-pins $q$, and actuated through rods $q^2$, connecting them with other levers, $Q^2$, operated upon by cams $Q^1$ on the crank-shaft E. The said rods $q^2$ are furnished with spiral springs $q^4$, to allow the levers Q to yield slightly when the shuttle strikes the pickers. These shuttle-stop levers and their appurtenances are not described as forming part of this invention, but only for the purpose of explaining the drawings of the complete loom.

The two protection-fingers $r^*\ r^*$ belonging to the two back sets of shuttle-boxes are both attached to one long protector-shaft, R*, (see Figs. 5, 8, 9, 10, and 11,) which extends all across the loom behind the raceway and shuttle-boxes, where it is supported in fixed bearings in the brackets G'; but as it would not be practicable to attach the fingers $r\ r$ belonging to the two front sets of shuttle-boxes to a shaft extending all across the loom, the latter fingers are attached to two short protector-shafts, R R, (see Figs. 1, 2, 5, 9, 10, 11,) which extend across the front of their respective set of shuttle-boxes, having fixed bearings at their outer ends in the outer brackets G', and near their inner ends in small standards $R^1$ on the main framing A of the loom. These shafts R are provided on their inner ends with arms $r^1$, which are connected by a pin-and-slot connection, $r^2$, (shown in Figs. 10 and 11,) with corresponding arms $r^3$ on a sleeve or hollow shaft, $R^2$, which is fitted to oscillate on the shaft R* of the back protector, and which thus serves to make a connection between the two shafts R, so that the movement given to the front protector-finger, $r$, on the left-hand side of the loom will be thereby transmitted to the front protector-shaft on the right-hand side, where the knocking-off mechanism is situated. This connection of the right-hand protector-shaft R is also shown in the detail views, Figs. 14 and 15, of which Fig. 14 is a transverse vertical section. Fig. 15 is an inverted sectional plan view taken in the line $o\ o$ of Fig. 14. Instead of the sleeve or hollow shaft $R^2$, a solid shaft working in separate bearings at the back of the raceway may be used to carry the arms $r^3$ for connecting the two protector-shafts R.

The means of connecting the protectors with the knocking-off lever is best illustrated in Figs. 8, 14, and 15, and is also partly shown in Fig. 16, which is a sectional plan view taken in the line $o\ o$, Fig. 14. The knocking-off lever S is attached, by its fulcrum-pin $l^8$, to the framing of the loom near the hand-lever $S^1$, which is employed to put the loom in and out of gear. The upper end of this lever S occupies such a position that when the loom is in gear the hand-lever stands close in front of it. The lower end of the said lever S is connected by a pusher-rod, $l$, (see Fig. 8,) with the lower end of a short lever, $l^1$, which hangs on a fixed fulcrum-pin, $l^2$, secured to the loom-framing on the driving side of the loom, and to which a spiral spring, $l^3$, is so applied as to tend to pull back the lower end of the lever S, and keep its upper end clear of the hand-lever. To a long pin, $l^4$, projecting laterally from the lower end of the said lever, there are attached two similar hooks, $l^5$ and $l^{5*}$, the former of which is shown in Fig. 14, and both in Fig. 16. The hook $l^5$ is connected by a rod, $l^6$, with the arm $r^1$ of the front protector-shaft, R, on the driving side of the loom, and the hook $l^{5*}$ is connected by a similar rod, $l^6$, with an arm, $r^4$, provided on the back protector-shaft, R*. Under these hooks $l^5$ and $l^{5*}$ is situated the T-shaped head $l^9$ of the upper arm of an elbow-lever, $S^2$, of which a perspective view is given in Fig. 14*. The fulcrum-pin $l^7$ of this lever works in a bearing in a hanger, $S^3$, secured to the framing A, and the other arm of the said lever bears upon the knocking-off cam $S^4$ on the crank-shaft E.

When there is a shuttle in each of the boxes opposite to which the protector-fingers $r\ r^*$ are situated, the said fingers are so forced out by the shuttle-binders that the arms $r^1$ and $r^4$ of the protector-shafts R R* lift the hooks $l^5$ and $l^{5*}$ out of reach of the T-shaped head $l^9$ of the elbow-lever $S^2$, and the said lever is oscillated by the knock-off cam $S^4$ without any effect on the knocking-off lever; but when a shuttle fails to enter one of the boxes, as it is required to do, and, therefore, the protector-finger belonging to that box is not pressed back, the arm $r^1$ or $r^4$ of its respective protector-shaft is depressed by the action of the spiral springs $r^5$ on the arms $r^6$ of the protector-shafts R and R*, as shown in Figs. 3 and 9, the said springs connecting the said arms with the stop-levers Q, or with a suitable contiguous portion of the loom-framing. The hook $l^5$ or $l^{5*}$ is then allowed to descend low enough to catch the T-head $l^9$ of the lever $S^2$, so that as the said head is thrown forward by the action of the cam $S^4$ on the said lever, it pulls with it the said hook and the short lever $l^1$. The pusher-rod $l$, which is attached to the said lever $l^1$, then pushes forward the lower end of the knocking-off lever S, and so throws back the upper end against the hand-lever $S^1$, which, being thereby knocked off and liberated from the catch or notch provided for it on the loom-framing, throws the loom out of gear by the action common to the hand-lever of power-looms.

The same levers, $S^2$ and $l^1$, and their appurtenances serve to operate in connection with the filling-stop by the attachment to the pin $l^4$ of the lever $l^1$ of an additional hook, $l^{10}$, which is similar to the hooks $l^5\ l^{5*}$, except that its point is turned upward, as shown in Fig. 14, instead of downward, like the points of $l^5\ l^{5*}$. The means of lifting this hook within range of the T-head $l^9$ of the lever $S^2$ to effect the knocking-off will be presently explained.

The filling-forks T T and the forked racks V V of the filling-stop, one of each for each side of the loom, are attached to two small rock-shafts, $t$ and $v$, arranged in bearings on or attached to the back of the raceway M, as shown in Figs. 11 and 14. One of the said forks and its corresponding rack, and portions of their rock-shafts $t\ v$, are also shown in the detail perspective view, Fig. 17. The said racks work through openings in the raceway M, as shown in Fig. 18, which exhibits a transverse section of a portion of the raceway, and a side view of one of the racks and its corresponding fork. The rock-shaft $v$ of the racks is furnished with an arm, $v^1$, (shown in Figs. 17 and 18, and in the detail plan view in Fig. 15, also in dotted lines in Fig. 14,) which is connected by a rod, $v^2$, (see Fig. 14,) with the hook $l^{10}$, above described, and the said hook is connected by a spiral spring, $v^3$, with the raceway. The effect of this spring is to raise the arm $v^1$, and thereby to raise the racks V; and when the filling is not pressed down upon one of the said racks by its corresponding fork T, the said racks are held up by the said spring so that the upper faces of the prongs of the rack are about even with the surface of the raceway. The tension of the springs $v^3$ is only sufficient to hold up the racks V, permitting the rack to be easily depressed by the action of the forks T upon the filling lying across the racks.

The forks T are depressed after every flight of a shuttle by the action of a cam, $T^1$, on the crank-shaft upon an elbow-lever, $T^2$, the fulcrum-pin $t^1$ of which is fitted to a bearing in a rigid hanger, $T^3$, secured to the loom-framing. This lever $T^2$ and cam $T^1$ and the connection of the said lever with the rock-shaft $t$ of the fork are shown in Fig. 11; but the cam and lever are more clearly shown in a partly-sectional side view, Fig. 21, and the form of the lever is shown in perspective view, Fig. 19.

The position of the cam $T^1$ on the crank-shaft is shown in Fig. 6 between the cam K, which operates the barrel J, and the shuttle-stop cam $Q^1$ at the left-hand side of the loom. The said lever $T^2$, which has a spiral spring, $t^2$, applied to it to keep it in contact with the cam, is connected with an arm, $t^3$, on the fork-shaft $t$; but in order to prevent an unyielding action of the said cam T on the forks, which would break the filling, the arm $t^3$, instead of being directly connected with the said lever $T^2$, is connected therewith by a second lever, $T^4$, which works on a pin, $t^9$, connecting it with the said lever $T^2$, and which is connected by a rod, $t^5$, with the said arm $t^3$. This lever $T^4$ is connected by a light spiral spring, $t^6$, with an upwardly-projecting branch, $t^7$, of the lever $T^2$, which spring $t^6$, except when the fork is pressing on the filling, holds the said lever $T^4$ in contact with a shoulder, $t^8$, on the lever T², but in case of the loom stopping with the forks down the said spring allows the forks to be raised by the operator to permit him to put a shuttle in a box which is opposite the raceway. The said spring also allows the forks to yield in case in the operation of the loom a shuttle or other obstruction gets under one of the forks when the cam T is operating to depress them.

Every time a shuttle has carried a shot of filling properly through the warp the filling is laid over the rack V next that side of the loom where the shuttle is received, and the corresponding fork T, coming down on the filling, presses it upon the rack and causes the latter to be depressed, and thereby causes the arm $v^1$ on the rock-shaft $v$ to be depressed and the rod $v^2$ to depress the hook $l^{10}$ out of reach of the T-head of the elbow-lever S², so that the said lever is inoperative on the knocking-off lever; but if the filling has broken or given out, the hook $l^{10}$ will remain raised by the spring $v^3$ and will be caught by the T-head of the lever, and thereby caused to pull forward the lever $l^1$, and, through the pusher-rod $l$, cause the lever S to knock off the hand-lever and throw the loom out of gear.

The movements of the finger-forks produced by the cam T¹ and the movements of the raceway and comb are so timed that when the raceway is in its backward position opposite the rear shuttle-boxes, and after the shuttle has been thrown across the raceway in that position, one of the filling-forks comes down upon the shot of filling thus carried through the warp, and the said filling, being grasped lightly between the said fork and its corresponding rack V, is carried forward with the raceway by the forward movement of the latter before the comb has risen up to the level of the filling and the latter has arrived in front of the range of the comb. By this means the filling is prevented from getting behind the heel of the fork, and so failing to move the hook $l^{10}$ out of the way of the lever S², and the entrance of the comb into the shed of the warp on a line behind the filling is insured.

In order to provide more effectually for the above-described operation, and also to afford greater convenience for the insertion of a shuttle into the shuttle-boxes when the loom is stopped with the forks T T pressed down by the cam T¹, and, further, to provide for making the said forks and the racks V V and their appurtenances operate under certain circumstances as a warp stop-motion, the said forks and racks are constructed and arranged so that their operative parts between which the filling operates have a space behind them wide enough for the passage of a shuttle, as shown in Fig. 18, where a shuttle, Z, is shown in section on the raceway M, and the shanks or arms of the fork in rear of its said operative parts are arched or bent upward to allow the shuttles to pass under them along the raceway. By thus making room for the shuttles to pass the forks, the loom will in many or most instances be stopped in case of the breakage of a warp-yarn, for by the said yarn becoming entangled with the other warp-yarns in front of the reed the filling will be held back behind the heel of the forks, and out of range of the forks and racks, and the loom will consequently be stopped, as it would be by the breakage or giving out of the filling.

This construction of the forks and racks to provide a space for the passage of the shuttle in rear of their operative parts is not in itself a part of my invention.

The driving-shaft B transmits rotary motion to the main shaft C of the loom by means of the small spur-wheel B¹ on the former gearing with a large spur-wheel, C¹, on the latter. Rotary motion is transmitted from the main shaft C to the crank-shaft E by means of the spur-wheel C¹ on the former and a spur-wheel, E², on the latter, and from the main shaft to the cam-shaft D by a spur-wheel, C³, on the former and a spur-wheel, D³, on the latter, the wheel E² having half as many teeth as C¹, and the wheel D³ having twice as many teeth as C³.

The driving-shaft carries the loose driving-pulley B², which receives the driving-belt, and the said pulley is suitably formed, as shown in section in Fig. 5, to match with a friction-clutch, B³, which is fitted to the said shaft with a feather, which prevents it from turning on the said shaft, while permitting it to move longitudinally thereon for putting the driving-pulley in and out of gear. The said clutch is operated in a well known way by means of a lever, B⁴, which is connected by a rod, B⁵, with the arm B⁶ of the shaft B⁷, which carries the hand-lever S¹. The driving-shaft has also fast upon it the bevel-toothed reversing-wheel W, (see Figs. 2, 5, and 8,) and a brake-wheel, U, which are shown as made in one piece. The brake-wheel and the brake U¹ and its operating mechanism are best shown in Fig. 22, which is a side view of its principal details, and is also partly shown in Fig. 23, which is a back view of the brake and reversing mechanism.

The brake U¹ is pivoted at its upper part by a pin, $u$, to the loom-framing, and its lower end is connected by toggle-joint $u^1$ $u^2$ with the arm $u^3$ of a four-armed lever, U². (Shown detached in a perspective view, Fig. 24.) The fulcrum-pin $u^4$ of this lever is secured in the loom-framing, and its arm $u^5$ is connected by rod, $u^6$, with the lower end of a swinging arm, $u^7$, which is pivoted to the loom-framing, and which is also connected by a rod, $u^8$, with the reversing-treadle Y in such manner that the depression of the said treadle by the foot of the operator to produce the reversing motion, which will be hereinafter described, will pull forward the rods $u^6$ and $u^8$ and the arm $u^5$ of the lever U², and so depress the arm $u^3$ thereof, which forms a third link to the toggle, and thereby produce a downward flexure of the joint between the latter arm and the link $u^2$ of the toggle, and so pull off the brake from the brake-wheel. The joint between the links $u^1$ $u^2$ of the toggle is connected by a rod, $w^9$, with an arm, $B^8$, on the rear end of the hand-lever rock-shaft $B^7$, so that when the hand-lever is knocked off, the spring $S^5$, which acts upon the said lever to put the loom out of gear, also acts, through the shaft $B^7$ of the hand-lever and through the arm $B^8$ and rod $w^9$, to produce the straightening of the joint between the toggle-links $u^1$ $w^3$, and so apply pressure to the brake to stop the loom. At the time that this operation takes place the connection of the toggle with the arm $w^3$ of the lever $U^2$ must be absolutely incapable of moving backward, and therefore a suitable stop must be provided for the lever $U^2$. This might be provided in various ways, but is shown as provided in a way which can be better explained after describing the reversing mechanism.

$W^1$, Figs. 2, 5, 8, and 23, is the reversing-shaft, arranged at right angles to the driving-shaft B, having its rear end secured in a small standard, $W^2$, on the loom-framing, and its front end in a box, $W^3$, fitted to the driving-shaft. To this shaft there is fitted to slide longitudinally thereon a small bevel-toothed wheel, $W^4$, to gear with the reversing-wheel W, and to this wheel $W^4$ there is secured a beveled friction-wheel, $W^5$, to gear with a beveled friction-wheel, $W^6$, which is secured to the loose pulley $B^2$. These wheels $W^4$ and $W^5$ are connected with the forked arm $u^{10}$ of the lever $U^2$.

When the loom is running the bevel-wheels $W^4$ and $W^5$ are held back out of gear from their respective bevel-wheels W and $W^6$ by means of a strong spiral spring, $u^{11}$, one end of which is attached to the loom-framing, and the other end to the lower arm, $u^*$, of the lever $U^2$; but when, after the stoppage of the loom, the treadle Y is depressed by the attendant, the rods $u^3$, arm $u^7$, and rod $u^6$ are thereby drawn forward. The lever $U^2$ is caused to push forward the bevel-wheels $W^4$ and $W^5$ into gear with the wheels W and $W^6$. The loose pulley $B^2$, turning freely on the driving-shaft, is caused to transmit motion, through the bevel friction-wheel $W^6$, to the corresponding wheel $W^5$ and attached wheel $W^4$ to the reversing-wheel W, which thus produces the rotation of the driving-shaft in the opposite direction to that in which the loose pulley rotates. As the wheels $W^4$ and $W^5$ are thus coming into gear the downward flexure of the joint between the link $w^2$ of the toggle and the front arm, $w^3$, of the lever $U^2$ pulls off the brake $U^1$ from the brake-wheel, as hereinbefore explained, and when the treadle is released the spring $u^{11}$ acts on the lever $U^2$ to pull the wheels $W^4$ $W^5$ out of gear, and at the same time to straighten the joint between $w^2$ and $w^3$ and again apply the brake. This spring, by its action through the lever $U^2$ on the wheel $W^4$, presses the hub of the latter against the standard $W^2$, and so provides the stop hereinbefore mentioned as necessary for the lever $U^2$ to make the connection between $w^2$ and $w^3$ immovable, that it may form a fixed bearing for the toggle in the action of the latter upon the brake.

During the reversing operation, as well as while the loom is stopped, the joint between the toggle-links $u^1$ and $u^2$ is straight, or nearly so; but when the loom is again thrown into gear by the hand-lever, the said lever, acting through its shaft $B^7$ and arm $B^8$ and the rod $w^9$, produces the upward flexure of the joint between $u^1$ and $u^2$, and so pulls off the brake from the brake-wheel.

By the two series of brake-connections made through the double toggle-joint, as hereinabove described, one brake is made to serve the purpose of stopping the loom both after running forward and after reversing, and the said brake is thrown off, both by the act of putting the loom in gear for running forward and by the act of throwing the reversing motion into gear.

I claim—

1. The combination of two series of shuttle-boxes, arranged one in front of the other on either side of the loom, a raceway moving back and forth between positions opposite to each set of shuttle-boxes, and a comb, detached from and moving independently of said raceway, for beating up the filling, substantially as herein set forth.

2. The combination, with a raceway independent of the lay, of two series of shuttle-boxes on either side of a loom, arranged close, or nearly close, together, and having their binders and the openings for the pickers on their outer sides, substantially as and for the purpose herein described.

3. The combination, with the wheel $J^3$, on the shaft of the shuttle-box-operating barrel J, and the pawl-rod $J^6$, carrying two pawls for turning the said barrel in opposite directions, of the stop $J^5$, the sleeve $b^1$, on the rod of said stop, the tappet $d^7$, on the pawl-rod, and the spring $b$, interposed between the said sleeve and the head of the stop, substantially as and for the purpose set forth.

4. The combination, with the wheel $J^3$, on the shaft of the shuttle-box-operating barrel J, and the two pawls $J^4$, for operating on said wheel to turn the said barrel in opposite directions, of the spring $d^5$, connecting the two pawls, and the slotted rods $d^6$, applied between the said pawls to prevent both from coming into gear at the same time, but permitting either to come into gear, substantially as herein described.

5. The combination, with the pickers, of the stationary spindle $k^1$ and the spindle $k^2$, arranged between centers, one of which is capable of yielding to allow the said spindle $k^2$ to be pulled out of its place at either end by the picker, substantially as and for the purpose herein set forth.

6. The combination, with two picking-stick-operating levers and a tappet-wheel on either side of the loom, of a sliding shaft, carrying the said levers, and means of moving the said shaft longitudinally, for the purpose of bringing either of said levers into a position to be operated by the said cam, and either or both out of said position, whereby the one cam is made capable of operating either of the two picking-sticks, but is prevented from operating both at once, substantially as herein described.

7. The combination of the tappet-wheel $P^1$, the sliding shaft $p^2$, two picking-stick-operating levers, $P^2$ $P^{2*}$, on the said shaft, the lever $P^3$, the cam $P^5$, the bevel-gear $P^6$, attached to the said cam, and the bevel-gear $P^7$, on the same shaft with the tappet-wheel, substantially as herein described, for the purpose set forth.

8. The combination, with the filling-stop fork or forks T of the loom and one or more yielding racks, V, carried by a rock-shaft, $v$, of a hook, $l^{10}$, connected with the said rock-shaft, and a lever, $S^2$, operated by a cam, $S^4$, on one of the continuously-rotating shafts of the loom, substantially as and for the purpose herein specified.

9. The combination of the knocking-off cam $S^4$, the lever $S^2$, and two or more hooks, $l^5$ $l^{5*}$ $l^{10}$, connected with the protector shaft or shafts, with the yielding rack or racks of the filling-stop and with the lever or device for knocking the loom out of gear, substantially as herein described, whereby the same lever or knocking-off device is operated both by the protector and the filling-stop, substantially as herein described.

10. The combination, with the filling-stop forks T and the cam $T^1$ and lever $T^2$, for operating the same, of the yielding shouldered lever $T^4$ and spring $t^6$, connecting the said forks with the said lever $T^2$, substantially as and for the purpose herein described.

11. The combination, with a shuttle-raceway and an independent comb, having a reciprocating movement for beating up the filling, and a rising-and-falling movement for bringing the said comb up into and taking it out of the warp, of yielding racks and filling-forks, and a cam so timed for operating the said forks that the latter will seize the filling and carry it forward in front of the range of the said comb, substantially as and for the purpose herein specified.

12. The combination, with the driving-shaft B and the loose pulley $B^2$, of the bevel-toothed reversing-wheel W, on the said shaft, the bevel friction-wheel $W^6$, fast on the loose pulley, the bevel-toothed wheel $W^4$, and attached bevel friction-wheel $W^5$, and means of bringing the said wheels $W^4$ and $W^5$ into gear with the wheels W and $W^6$ when required for giving the reversing motion to the loom, substantially as herein described.

13. The combination, with the bevel friction-gear $W^6$ on the loose pulley, the bevel-toothed backing-off wheel W, and the brake-wheel U on the driving-shaft, the attached bevel friction-gear $W^5$, and bevel-toothed gear $W^4$, and the brake U, of the lever $U^2$, connected with the said wheels $W^4$ $W^5$, and connected by a toggle with the brake, whereby when the said wheels $W^4$ $W^5$ are thrown into gear the brake is withdrawn from the brake-wheel, and when the said wheels are thrown out of gear the brake is applied, substantially as herein described.

14. The combination of the hand-lever $S^1$, its shaft $B^7$, and arms $B^6$ and $B^8$, of the clutch-lever $B^4$, connected with the said arm $B^6$, and the brake $U^1$, connected with the said arm $B^8$ by a toggle, whereby the said brake is thrown off the brake-wheel by the hand-lever when the loom is in gear, and thrown on the said wheel when the loom is out of gear, substantially as herein described.

15. The three-linked toggle $u^1$ $u^2$ $u^3$, connecting the brake at one of its joints with the hand-lever and at another of its joints with the reversing-treadle, substantially as herein described, whereby the same brake is made to serve for stopping the loom both after running forward and after reversing, substantially as herein described.

JOHN C. DUCKWORTH.

Witnesses:
HENRY T. BROWN,
VERNON H. HARRIS.